United States Patent
Ruppert et al.

(10) Patent No.: US 6,634,788 B2
(45) Date of Patent: Oct. 21, 2003

(54) COAXIAL THERMOCOUPLE SENSOR

(75) Inventors: Paul Ruppert, Wetzikon (CH); Thomas Brossi, Bauma (CH)

(73) Assignee: Meteolabor AG, Wetzikon (CH)

(*) Notice: Subject to any disclaimer, the term of this patent is extended or adjusted under 35 U.S.C. 154(b) by 0 days.

(21) Appl. No.: 09/854,814

(22) Filed: May 14, 2001

(65) Prior Publication Data

US 2002/0021743 A1 Feb. 21, 2002

(30) Foreign Application Priority Data

Jun. 9, 2000 (CH) .............................. 1145/00

(51) Int. Cl.$^7$ .......................... G01K 7/06; H01L 35/04
(52) U.S. Cl. ................... 374/179; 136/228; 136/233
(58) Field of Search ................ 374/179, 208; 136/228, 233, 232, 230

(56) References Cited

U.S. PATENT DOCUMENTS

| | | | | |
|---|---|---|---|---|
| 2,438,575 A | * | 3/1948 | Ray | 136/228 |
| 2,516,952 A | * | 8/1950 | Bristol | 136/233 |
| 3,343,589 A | | 9/1967 | Holzl | 164/46 |
| 3,407,097 A | * | 10/1968 | Engelhard | 136/228 |
| 3,801,377 A | * | 4/1974 | Brewer et al. | 136/233 |
| 3,819,420 A | * | 6/1974 | Schmidt et al. | 136/233 |
| 3,890,162 A | * | 6/1975 | Dawson et al. | 136/233 |
| 3,970,481 A | * | 7/1976 | Stroik | 136/233 |
| 4,018,624 A | * | 4/1977 | Rizzolo | 374/179 |
| 4,277,886 A | * | 7/1981 | Bauer et al. | 136/233 |
| 4,369,795 A | * | 1/1983 | Bicher et al. | 374/179 |
| 4,484,018 A | * | 11/1984 | McLynn | 136/233 |
| 4,527,909 A | * | 7/1985 | Dale et al. | 374/179 |
| 4,624,582 A | * | 11/1986 | Banda et al. | 374/181 |
| 4,647,710 A | | 3/1987 | Davis | 136/237 |
| 4,732,619 A | * | 3/1988 | Nanigian | 136/228 |
| 4,865,462 A | * | 9/1989 | Broomfield | 374/179 |
| 4,934,831 A | * | 6/1990 | Volbrecht | 374/179 |
| 5,464,485 A | * | 11/1995 | Hall, Jr. | 374/179 |
| 5,813,765 A | * | 9/1998 | Peel et al. | 374/208 |
| 5,986,261 A | * | 11/1999 | Lewis et al. | 136/228 |

FOREIGN PATENT DOCUMENTS

| | | | |
|---|---|---|---|
| EP | 0 140 631 A2 | 5/1985 | |
| EP | 0 570 239 A2 | 11/1993 | |
| FR | 988103 | 8/1951 | |
| FR | 1276557 | 3/1962 | |
| FR | 2108462 | 5/1972 | |
| FR | 2621120 | * 3/1989 | 374/208 |

OTHER PUBLICATIONS

Isakov, Yu. A., "Flexible coaxial thermocouple," Meas. Tech., vol. 15, No. 8, Aug. 1972, p. 1275.*

(List continued on next page.)

Primary Examiner—Diego Gutierrez
Assistant Examiner—Stanley J. Pruchnic, Jr.
(74) Attorney, Agent, or Firm—Maginot, Moore & Bowman

(57) ABSTRACT

The invention provides a temperature sensor on the basis of a thermocouple constituted by two different metals. The first metal is provided in the form of an electrically insulated wire, having a blank uninsulated portion. The second metal is constituted by a jacket member enclosing the insulated wire. The jacket member is in electrical contact with the insulated wire via the blank uninsulated portion to thereby form a measuring junction. As a feed line, an electrically insulated copper wire is provided whose free end has a blank portion. The first wire is wound around the copper wire and projects over the free end thereof. The jacket member extends over the blank uninsulated portion of the carrier wire and is in electrical contact therewith. Due to the fact that the same material is chosen for the jacket member and for the carrier wire, i.e. copper, the carrier wire can be used as electrical feed line. The coaxial jacket member is provided, at least in the region of the measuring junction, with a reflective coating.

18 Claims, 1 Drawing Sheet

OTHER PUBLICATIONS

Peek, M.K. and Salt, H., "Measurement of transient temperatures at the centre of a sphere," J. Phys. Sci. Instrum. 20, 1987, pp. 395–398.*

Schmidt, H. "Schnelle, koaxiale Mini–Thermoelemente" Technisches Messen ATM., vol. J242–2, Mar. 1973, pp. 53–56.

Anonymous "Thermoelemente mit einer Ansprechzeit von einer Mikrosekunde" MTZ Motortechnische Zeitschrift., vol. 31, Jul. 1970, p. 329.

Anonymous "Air/Sea Temperature Probe Developed" NTIS Tech Notes, U.S. Department of Commerce. Springfield, VA, Jan. 1, 1992 (2 pages).

* cited by examiner

COAXIAL THERMOCOUPLE SENSOR

BACKGROUND OF THE INVENTION

The present invention refers to a temperature sensor on the basis of a thermocouple constituted by two different metals. The first metal is provided in the form of an electrically insulated wire, having a blank uninsulated portion. The second metal is constituted by a jacket member enclosing the insulated wire. The jacket member is in electrical contact with the insulated wire via the blank uninsulated portion to thereby form a measuring junction.

For measuring a temperature, a variety of sensor members are used, amongst else also on the basis of thermocouples. Since the air temperature is probably the most frequently measured value worldwide, in the following, the problems occurring upon measuring the temperature of the air in the free atmosphere are discussed.

Superficially considered, the measurement of the air temperature appears to be a very easy task; however, measuring the air temperature may pose problems in many cases, for example upon measuring in higher regions of the atmosphere. For example, radio sondes climb to altitudes of 30'000 meters and more where measuring the temperature is complicated by the low density of the air. In an altitude of 30'000 meters, the barometric pressure is typically 10 hPa, i.e. hundred times less than at sea level. Moreover, the solar radiation amounts to 130 mW/cm$^2$ per day.

Since the temperature sensor provided for measuring the temperature has to be exposed to the ambient air, it is heated up by the solar radiation absorbed by its surface. A radio sonde climbs with a velocity of typically 5 m/s. The air flow thereby caused ventilates the temperature sensor whereby a portion of the absorption heat is lead away. In addition to the solar radiation, also the infrared radiation has to be considered. At night, in many cases, the temperature sensor emits infrared radiation having a long wavelength and consequently cools down. Together with the heat exchange with the ambient air, a thermal equilibrium establishes. Thus, the temperature sensor does not adopt the real air temperature, but it measures a temperature distorted by the radiation error. Consequently, the temperatures delivered by the radio sonde usually are too high during the day and too low at night.

By means of modern computer technology, such an error can be arithmetically compensated at the receiving station. However, the accuracy of such arithmetic error compensation is limited. Even if the direct solar radiation is exactly known, other radiation influences like the infrared radiation and particularly the reflection of the solar radiation at the earth surface and at the upper limits of the clouds, the so-called Albedo, are subject to considerable variations and, therefor, can be compensated for only approximately.

Consequently, regardless of the arithmetic correction of the measured values, a radiation error of the temperature sensor as low as possible is most desirable.

The radiation error of a temperature sensor and the measuring junction, respectively, is influenced by the flow velocity that itself depends on the particular application; it can be minimized by means of the following methods:

design of the temperature sensor and, particularly, of the measuring junction as small as possible;

high reflectivity of the surface of the temperature sensor subjected to the radiation, effective for all wavelengths of light and heat radiation present in the atmosphere.

For temperature sensors to be used in conjunction with radio sondes, nowadays, usually resistors or capacitors are used having particularly pronounced temperature dependent resistance and capacitance, respectively. The diameter of the rod-shaped or ball-shaped sensors varies between 0.2 and 2 mm. Moreover, for fixing the sensors and for the electrical connection thereof, wires and frame members are required. These additional means influence the heat balance "radiation/convection" in a negative sense, i.e. the radiation effect increases. Both the sensor as well as its suspension are surface treated with reflective layers. Thereby, white lacquers or metallic coatings are used. As a metallic surface, nowadays, nearly exclusively aluminum is taken into consideration. Nevertheless, only with enormous efforts, one succeeded in manufacturing temperature sensors having the afore mentioned desirable small dimensions. Thus, the temperature sensors based on resistors and capacitors usually have to be individually calibrated in order to meet an accuracy of for example ±0.3° K in the region of −90° C. to +50° C. On the other hand, those sensors have the advantage of a relatively large swing, rendering the electronic signal processing much more easy. Using such temperature sensors, radiation errors in the region of 1 to 3° K may occur during daytime in heights of 30'000 meters.

PRIOR ART

In the publication "H. Schmidt: Schnelle, Koaxiale Mini-Thermoelemente [Technisches Messen ATM, Vol. J242-2, March 1973, pages 53–56]", coaxially designed thermocouples are disclosed, having an outer diameter of <90 μm. Thereby, the one thermocouple metal is constituted by a metallic wire encapsulated by quartz glass, inserted into a glass capillary tube and molten in therein. The metallic wire projects by a few millimeters out of this glass capillary tube. The glass capillary tube, together with the metallic wire, is inserted into a metallic tube member that is applied to the glass by ion plasma atomization, resulting in an electric connection between the metallic tube member and the projecting wire. Thereby, the real measuring junction is formed.

The document FR 2,108,462 discloses a thermocouple in which the one metal of the thermocouple is constituted as a Taylor wire, molten into a glass capillary tube. The other metal of the thermocouple is constituted by a coaxial jacket around the glass capillary tube. The Taylor wire molten into the glass capillary tube projects somewhat out of that tube, with the result that the contact location between Taylor wire and jacket constitutes the thermoelectrically effective measuring junction.

The document FR 988,103 discloses a coaxially designed thermocouple as well, in which the central conductor is insulated vis-à-vis the tube-shaped conductor surrounding it by means of a powdery insulating material. The rear end of this thermocouple is provided with solder joints for attaching connecting wires thereto.

The document U.S. Pat. No. 3,348,589 discloses a method of manufacturing thermocouples and the thermocouples manufactured according this method. Thereby, a coaxially designed thermocouple is suggested, comprising a central wire and a tube-like conductor surrounding the central wire. For positioning the central wire inside the tube-like conductor, a tube-shaped insulation member is provided, whereby the central wire is in electrical contact with the tube-like conductor at the tip of the thermocouple, thereby forming a measuring junction.

The document EP 0,570,239 discloses a thermocouple consisting of a plurality of insulating and conducting layers. Thereby, a central wire having an insulation coating is provided. Applied onto that insulation coating, a conductive layer is applied that is in electrical contact with the central wire in the region of the tip thereof, thereby forming the measuring junction. At the rear end of the thermocouple, annular soldering lugs are provided to which connecting wires can be soldered.

The document EP 0,140,631 discloses a thermocouple in which a central conductor and a jacket member surrounding the central conductor are provided, whereby the front end of the central conductor is welded to the jacket member to form a measuring junction. The central conductor consists mainly of copper, while the surrounding jacket member is made of essentially copper-free material. The welding seam is said to contain less than 10% copper.

Finally, the document "Thermoelemente mit einer Ansprechzeit von einer Mikrosekunde [MTZ Motortechnische Zeitschrift, Vol. 31, Nr. 7, July 1970, page 329]" discloses a coaxially designed thermocouple, consisting of an inner thermo-wire and an outer thermo-wire in the shape of a tube member. The real measuring junction is constituted by a tiny plate member manufactured by vacuum vapor plating.

A fundamental problem associated with all the embodiments of thermocouples mentioned herein before may be seen in the facts that they are of relatively complicated design, resulting in an expensive manufacturing process, and that at least one of the metallic parts constituting the thermocouple, usually the coaxial jacket, has to be provided with a connection junction. Such connection junctions, however, are undesirable since they evoke the danger of creating parasitic thermal voltages.

OBJECTS OF THE INVENTION

It is an object of the present invention to provide a temperature sensor on the basis of a thermocouple constituted by two different metals that is of very simple design.

It is a further object of the present invention to provide a temperature sensor on the basis of a thermocouple constituted by two different metals that may be connected directly to an electric or electronic measurement unit.

It is still a further object of the present invention to provide a temperature sensor on the basis of a thermocouple constituted by two different metals that enables measuring temperatures with a very high accuracy.

Finally, it is an object of the present invention to provide a temperature sensor on the basis of a thermocouple constituted by two different metals that has very small physical dimensions.

SUMMARY OF THE INVENTION

To meet these and other objects, the present invention provides a temperature sensor on the basis of a thermocouple constituted by two different metals.

The first metal is provided in the shape of an electrically insulated wire having an uninsulated portion, and the second metal is provided in the shape of a jacket member at least partially coaxially enclosing the electrically insulated wire. The jacket member is in electrical contact with the uninsulated portion of the above mentioned wire to thereby form a measuring junction.

An electrically insulated carrier wire is provided, having a blank uninsulated portion, whereby the jacket member and the carrier wire consist of the same metallic material. The jacket member further encloses the carrier wire at least in the region of the above mentioned blank uninsulated portion of the carrier wire, thereby being in electrical contact with the blank uninsulated portion of the carrier wire.

In this way, a thermocouple can be designed, having a very small measuring junction and a very low mass. Due to the fact that the jacket member and the carrier wire consist of the same metallic material, and because the jacket member encloses the carrier wire in the region of the above mentioned blank uninsulated portion, an electrical contact with the blank uninsulated portion of the carrier wire can easily be established, avoiding any parasitic thermal voltages, and the carrier wire can be used as a connecting wire to the electric or electronic measuring unit.

In the measuring junction of the thermocouple used in the temperature sensor according to the present invention, the error caused by radiation is considerably smaller than in a conventional measuring junction in which two wires or a wire and a tube member are soldered or welded together for constituting the measuring junction. Moreover, the temperature sensor according to the invention reacts very quickly to temperature variations, thanks to its low mass; this can be a crucial advantage particularly when the barometric pressure is very low. Thus, the temperature sensor according to the invention is particularly suitable to be used in radio sondes climbing to very high altitudes.

BRIEF DESCRIPTION OF THE DRAWINGS

In the following, an embodiment of the apparatus according to the invention will be further described, with reference to the accompanying drawings, in which.

DETAILED DESCRIPTION OF A PREFERRED EMBODIMENT

Figure 1:
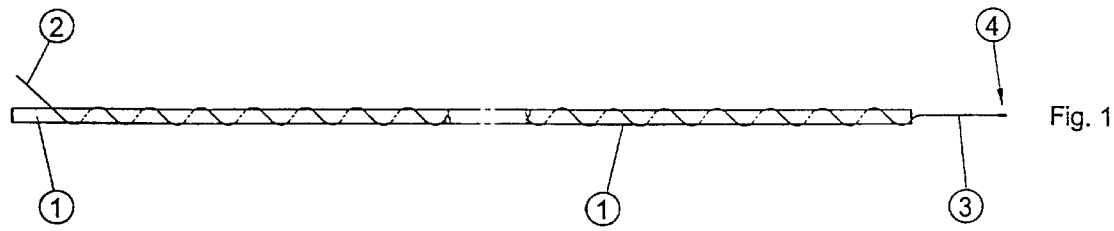
FIG. 1 shows an embodiment of the temperature sensor of the invention in a schematic view.

FIG. 1 shows an embodiment of the temperature sensor in a schematic view, as it can be provided, for example, to be used in a radio sonde. As can be seen in the drawing, a straight portion of an electrically insulated copper wire 1 serves as a mechanical carrier for a second wire 2 made of a copper/nickel, known as "Constantan". The wire 2 is electrically insulated as well and is wound on the carrier wire 1 in the form of a spiral. In the present example, the expression "electrically insulated" shall mean that the wires 1 and 2 are provided with an electrically insulating lacquer layer; however, any other suitable form of electrical insulation might be used.

The constantan wire 2 projects over the free front end of the electrically insulated carrier wire 1 by some centimeters, whereby the portion 3 of the wire 2 projecting over the wire 1 is in straight shape. The measurement junction is formed in the region of the free front end of the constantan wire 2. The rear ends of the two wires 1, 2 can be connected directly to an electric or electronic measurement unit (not shown). Preferably, the diameter of the carrier wire 1 is a multiple of the diameter of the constantan wire 2, such that the former one can be used, as shown in the drawings, as a mechanical carrier means for the constantan wire 2.

Figure 2:
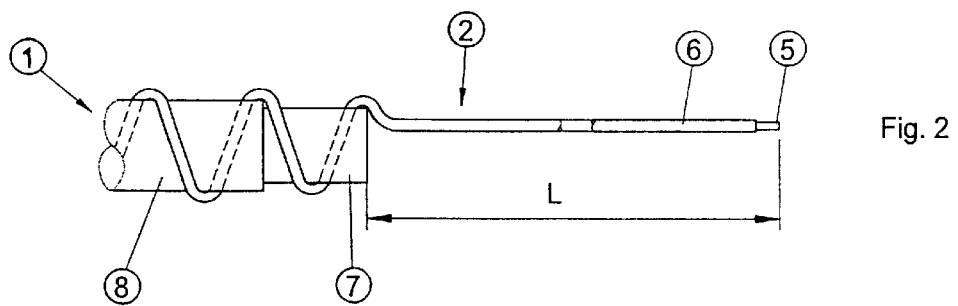
FIG. 2 shows an enlarged view of the front portion of the temperature sensor of FIG. 1 during a phase of manufacturing.

FIG. 2 shows an enlarged view of the front portion of the not yet finished temperature sensor. The constantan wire 2 provided with an insulation layer 6 comprises a front portion 5 in which the insulation 6 was omitted or removed. Accordingly, the carrier wire 1 comprises a front portion with a blank section 7 in which the insulation 8 was omitted or removed. The length L of the straight portion of the constantan wire 2 amounts to a few centimeters in the present example; however, it can be varied according to the special requirements of a particular application. Since the constantan wire 2 is provided with an insulation layer 6, except on its very front portion, it is made sure that no electrical contact exists between the two wires 1 and 2 along the blank portion 7 of the carrier wire 1.

Figure 3:
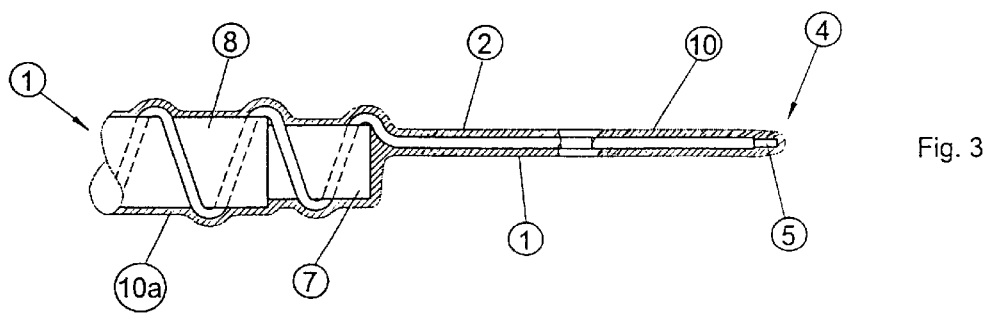
FIG. 3 shows an enlarged view of the front portion of the temperature sensor of FIG. 1 in its final form.

FIG. 3 shows the front portion of the temperature sensor according to FIG. 2 once it is finished. As can be seen from FIG. 3, the constantan wire 2 is provided with a coaxial jacket 10, 10a extending both along the straight portion of the constantan wire 2 as well as the free blank end 7 of the carrier wire 1 and also including a part of its portion provided with the insulation layer 8. The coaxial jacket 10, 10a consists of the same material as the carrier wire 1, in the present example copper, and provides an electrically conductive connection between the uninsulated portion 5 of the constantan wire 2 and the blank portion of the carrier wire 1. Simultaneously, at the free end of the constantan wire 2, the real measuring junction is established, namely by the electrical contact point between the uninsulated portion 5 of the constantan wire 2 and the jacket 10.

Preferably, the surface of the coaxial jacket 10 made of copper can be provided with a highly reflective layer (not shown in the drawings) that reduces the absorption of radiation during the day and decreases the emission of infrared radiation during the night. Such layer can consist, for example, of a bright white lacquer, of aluminum or of a precious metal.

In a classical sense and according to the prior art teaching, two metallic wires are used to form a measuring junction 4. In contrast thereto and according to the present invention, the one metal is constituted by an electrically insulated wire 2 with an uninsulated portion 5, and the second metal is constituted as a coaxial jacket 10 of the wire 2, whereby the jacket 10 is in electrical contact with the wire 2 at the region of its uninsulated portion 5, thereby forming the measuring junction 4. Thereby, a temperature sensor in the form of a thermocouple is created that is very small, whereby any welding or soldering operation for interconnecting the two metals is avoided. Due to the fact that the coaxial jacket 10 consists of the same material as the carrier wire 1, in the present example copper, the carrier wire 1 can also be used as an electrical conductor without the danger that a further parasitic thermocouple is formed at the point of electrical contact 7 between jacket 10 and carrier wire 1.

Since the measuring junction 4 is located at the free end of the constantan wire 2, the temperature sensor according to the invention also offers advantages with regards to its flow behavior, i.e. the measuring junction 4 can be freely exposed to the ambient air. As it is possible to manufacture wires having a diameter as small as 10 micrometers, the design of extremely small temperature sensors and thermocouples, respectively, is possible. Essentially, the final diameter of the thermocouple is determined by the diameter of the constantan wire 2 since the jacket 10, 10a can be applied in thin film technique.

It is understood that the temperature sensor as described herein before is only an example and does not have definitive character. For example, the pairing of the two metals constituting the thermocouple could be changed.

The measuring junction 4 does not necessarily have to be provided at the free end of the constantan wire 2, but could be somewhere along the straight portion 3 of the constantan wire 2 by providing a blank section thereof; in this case, the constantan wire 2 could be mechanically fixed at its free end.

In a temperature sensor as herein before described and having the design according to the invention, the radiation error is considerably less than in a conventional thermocouple in use nowadays. Moreover, the temperature sensor according to the invention has, due to the low mass of the measuring junction, a very short time constant; thus, it reacts very quickly to temperature variations of the ambient air. Tests have shown that temperature sensors can be manufactured by means of carefully adjusted manufacturing methods which have an accuracy of better than ±0.1° K in the region of ±100° C., without individual calibration.

The design of a temperature sensor according to the invention improves for example the accuracy of the radio sonde thermometry by a factor between five and ten.

It is understood that the temperature sensor of the invention also can be used in completely different fields of applications other than the radio sonde thermometry. For example, applications in the fields of medicine, biology, physics, chemistry and so on are possible.

What is claimed is:

1. Temperature sensor incorporating a bi-metal thermocouple, comprising:

a first metallic wire having an uninsulated portion and an insulated portion;

a metallic jacket at least partially coaxially enclosing said first metallic wire, said jacket being directly in electrical contact with said uninsulated portion of said first metallic wire to thereby form a measuring junction;

an electrically insulated carrier wire provided with a blank uninsulated portion;

said jacket and said carrier wire consisting of the same metallic material, and said jacket further enclosing said carrier wire at least in the region of said blank uninsulated portion of said carrier wire, thereby being directly in electrical contact with said blank uninsulated portion of said carrier wire, and said first metallic wire is spirally wound around said carrier wire and projects over a free front end of said carrier wire to thereby form the measuring junction.

2. Temperature sensor according to claim 1 in which the diameter of said carrier wire is greater than the diameter of said first metallic wire.

3. A temperature sensor, comprising:

a first wire assembly having a first metallic conductor and a first insulator at least partially enclosing said first metallic conductor, said first wire assembly having a first uninsulated segment at which a portion of said first metallic conductor is free of said first insulator;

a metallic jacket at least partially coaxially enclosing said first wire assembly, said metallic jacket being positioned in direct physical contact with said first metallic conductor at said first uninsulated segment whereby a measuring junction is formed;

a carrier wire assembly having a second metallic conductor and a second insulator at least partially enclosing said second metallic conductor, said second wire assembly having a second uninsulated segment at which a portion of said second metallic conductor is free of said second insulator, wherein said metallic jacket is also positioned in direct physical contact with said second metallic conductor at said second uninsulated segment, and wherein said second uninsulated portion of said carrier wire assembly is located at a distal end portion of said second wire assembly.

4. The temperature sensor of claim 3, wherein said metallic jacket and said second metallic conductor are made of the same metallic material.

5. The temperature sensor of claim 3, wherein:

said first wire assembly is spirally wound around said second wire assembly and projects over a distal end portion of said second wire assembly so as to form an unsupported segment, and said measuring junction is located on said unsupported segment.

6. The temperature sensor of claim 3, wherein:

said first wire assembly possesses a first diameter D1, and said second wire assembly possesses a second diameter D2, and

D2>2(D1).

7. The temperature sensor of claim 3, wherein said metallic jacket possesses a reflective coating thereon at said measuring junction.

8. The temperature sensor of claim 7, wherein said reflective coating includes a material which is selected from the group consisting of an aluminum, an aluminum alloy, and a precious metal.

9. The temperature sensor of claim 3, wherein said metallic jacket also encloses said second wire assembly at least at said second uninsulated segment.

10. The temperature sensor of claim 3, wherein said metallic jacket and said second metallic conductor are each made of a copper material.

11. Temperature sensor incorporating a bi-metal thermocouple, comprising:

a first metallic wire having an uninsulated portion and an insulated portion;

a metallic jacket at least partially coaxially enclosing said first metallic wire, said jacket being directly in electrical contact with said uninsulated portion of said first metallic wire to thereby form a measuring junction;

an electrically insulated carrier wire provided with a blank uninsulated portion;

said jacket and said carrier wire consisting of the same metallic material, and said jacket further enclosing said carrier wire at least in the region of said blank uninsulated portion of said carrier wire, thereby being directly in electrical contact with said blank uninsulated portion of said carrier wire, and said jacket extends on said carrier wire over said blank uninsulated portion thereof and further over an adjacent portion thereof.

12. Temperature sensor according to claim 11 in which said uninsulated portion of said carrier wire is located at a free front end of said carrier wire.

13. Temperature sensor according to claim 11 in which said jacket is provided, at least in the region of said measuring junction, with a reflective coating.

14. Temperature sensor according to claim 13 in which said coating consists of aluminum, of an aluminum alloy or of a precious metal.

15. Temperature sensor according to claim 11 in which said uninsulated portion of said first metallic wire is located at a free end of said first metallic wire.

16. Temperature sensor according to claim 11 in which said jacket is formed by a thin film technique that includes applying a material over said first metallic wire and at least partially over said carrier wire.

17. Temperature sensor according to claim 11 in which said first metallic wire consists of constantan.

18. Temperature sensor according to claim 11 in which both said carrier wire and said jacket consist of copper.

* * * * *